United States Patent [19]
Flockhart et al.

[11] Patent Number: 5,982,873
[45] Date of Patent: Nov. 9, 1999

[54] WAITING-CALL SELECTION BASED ON OBJECTIVES

[75] Inventors: Andrew D. Flockhart, Thornton, Colo.; Robin Harris Foster, Little Silver, N.J.; Joylee E. Kohler, Northglenn, Colo.; Eugene P. Mathews, Barrington, Ill.

[73] Assignee: Lucent Technologies Inc., Murray Hill, Del.

[21] Appl. No.: 08/812,617

[22] Filed: Mar. 7, 1997

[51] Int. Cl.⁶ .................................................. H04M 3/00
[52] U.S. Cl. ........................................... 379/266; 379/265
[58] Field of Search ................................ 379/265, 266, 379/309, 201, 242, 243, 244, 245, 246

[56] References Cited

U.S. PATENT DOCUMENTS

| | | | |
|---|---|---|---|
| 4,330,857 | 5/1982 | Alvarez, III et al. | 370/104 |
| 5,164,983 | 11/1992 | Brown et al. | 379/265 |
| 5,369,745 | 11/1994 | Faber | 395/200 |
| 5,390,243 | 2/1995 | Casselman et al. | 379/265 |
| 5,467,391 | 11/1995 | Donaghue, Jr. et al. | 379/265 |
| 5,506,898 | 4/1996 | Costantini et al. | 379/266 |
| 5,754,639 | 5/1998 | Flockhart et al. | 379/265 X |
| 5,857,018 | 1/1999 | Sumner et al. | 379/266 |
| 5,864,617 | 1/1999 | Donnelly | 379/266 |
| 5,867,572 | 2/1999 | MacDonald et al. | 379/266 |

OTHER PUBLICATIONS

"Performance Modelling of Automatic Call Distributors: Assignable Grade of Service Staffing", Proceedings of the International Switching Symposium, Yokoham, Oct. 25–30, 1992, vol. 2, No. Symp. 14, Oct. 25, 1992, pp. 294–298, XP000337733 Institute of Electronics; Information and Communication Engineers *the whole document*.
Kleinrock, Leonard: "Queueing Systems vol. II: Computer Applications" 1976, John Wiley & Sons XP002091802 * p. 126, paragraph 3.7–p. 127*.
Jackson, James R.: "Queues With Dynamic Priority Discipline" Management Science Journal, vol. 8, No. 1, 1961, pp. 18–34, XP002091801 p. 18–p. 19.

U.S. Patent Application, A. D. Flockhart 2–3 et al., Serial No. 08/505,142, "Prediction of a Caller's Motivation as a Basis for Selecting Treatment of an Incoming Call", Filed Jul. 21, 1995.
U.S. Patent Application, C.C. Wu 1, "Changing–Urgency–Dependent Message or Call Delivery", Mailed Jan. 22, 1997.
*Teledata Solutions' Call Link*, Teleconnect, Dec. 1996, vol. 14, Issue 12, p. 38.
Siemens Rolm Announces ResumeRouting Software for Call Centers New Server–Based Software Revolutionizes Call Center Operations, Santa Clara, CA, Aug. 21, 1995, Siemens Rolm Communications Inc.
*The New Model for Call Center Routing ResumeRouting™ and Virtual Agent Groups*, Siemens Rolm Communications Inc., Santa Clara, CA, pp. 2–9.
*Netspeak's Hot Internet Sun Product*, Computer Telephony, Aug. 1996, vol. 5, Issue 8, pp. 120–124.

*Primary Examiner*—Scott Weaver
*Attorney, Agent, or Firm*—David Volejnicek

[57] ABSTRACT

Call-center (FIG. 1) performance is improved by assigning different service-time objectives (222) to different types of calls or to call queues (21) for different types of calls, and then selecting (212), for an agent (25) who has just become available (200) to handle a call, a waiting call that is farthest along in exceeding its assigned service-time objective. The objectives represent limits on the amount of time that calls should spend waiting for agents before being handled. For example, a video call may need to be serviced within tens of seconds of its arrival, and a voice-only call may need to be serviced within minutes, while e-mail may need a response within hours of its arrival. Relative distance of calls from their assigned service-time objectives is preferably determined by determining (206) the calls' present or anticipated wait times and computing (210) weighted percentages of the assigned service-time objectives that are represented by the present or anticipated wait times. The call with the highest weighted percentage is then selected (212) and assigned (214) to the available agent for handling. The process is repeated each time that any agent becomes available.

20 Claims, 1 Drawing Sheet

WAITING-CALL SELECTION BASED ON OBJECTIVES

TECHNICAL FIELD

This invention relates to queuing arrangements, for example to telephone call-answering centers and automatic call-distribution systems.

BACKGROUND OF THE INVENTION

In automatic call-distribution (ACD) systems, calls incoming to a call center are answered and handled by a plurality of agents. The ACD system automatically distributes and connects incoming calls to whatever agents are suited to handle the calls and available, that is, not handling other calls at the moment.

It often happens that the call center becomes overloaded by calls, so that no suitable agents are available to handle calls at the moment that the calls come in. The calls then back up. They are placed in different queues based upon some preestablished criteria, and are placed in each queue in the order of their arrival and/or priority. There they await suitable agents becoming available to service them. The waiting calls are distributed to agents for handling on an oldest-call-waiting (OCW) basis. That is, when an agent becomes available, the system considers the call at the head of each queue from which that agent is eligible to handle a call, and selects the one of the calls that has been waiting the longest. The system does not take into consideration the unique service-time needs of different types of calls. For example, a video call may need to be serviced within tens of seconds of its arrival, and a voice-only call may need to be serviced within minutes, while e-mail may need a response within hours of its arrival.

SUMMARY OF THE INVENTION

This invention is directed to solving these and other deficiencies of the prior art. Illustratively according to the invention, call center performance in meeting the needs of clients is improved by assigning different service-time objectives to different types of calls or to call queues for different types of calls, and then selecting a waiting call that is farthest along in (e.g., closest to) exceeding its assigned service-time objective for handling by an available agent. The objectives represent limits on the amount of time that calls should spend waiting for agents before being handled. Given this capability, call types can be prioritized by having different assigned service-time objectives. As the service-time objective of a waiting call is approached, the urgency, or priority, of the waiting call automatically increases relative to newly-arriving calls.

Generally according to the invention, there is provided a method of and an apparatus for selecting one of a plurality of items (e.g., communications) that are waiting to be selected. Different ones of a plurality of waiting-time limits are assigned to different ones of the plurality of items. A determination is then made of which one of the plurality of waiting items is farthest along in exceeding its assigned waiting-time limit, and the one item that is farthest along in exceeding its assigned waiting time limit is selected. The second and third steps are preferably repeated until only one item of the plurality remains waiting to be selected. The determination is preferably made by determining a present waiting time for each one of the plurality of waiting items and then determining a ratio—for example, a percentage—of the present waiting time and the assigned waiting-time limit for each one of the plurality of waiting items. The ratio may be either straight or weighted. The waiting item having the largest determined ratio is then selected.

While the method comprises the steps of the just-characterized procedure, the apparatus effects the method steps. The apparatus preferably includes an effector—any entity that effects the corresponding step, unlike means—for each step. Further according to the invention, there is provided a computer-readable medium containing software which, when executed in a computer, causes the computer to perform the method steps.

If the plurality of waiting items are communications that are waiting to be processed (e.g., handled by agents) the procedure involves assigning different ones of the plurality of waiting communications to different ones of a plurality of waiting-time limits, determining which one of the plurality of waiting communications is farthest along in exceeding its assigned waiting-time limit, and first processing the determined one of the plurality of waiting communications.

These and other advantages and features of the invention will become more apparent from the following description of an illustrative embodiment of the invention taken together with the drawing.

DETAILED DESCRIPTION

Figure 1:
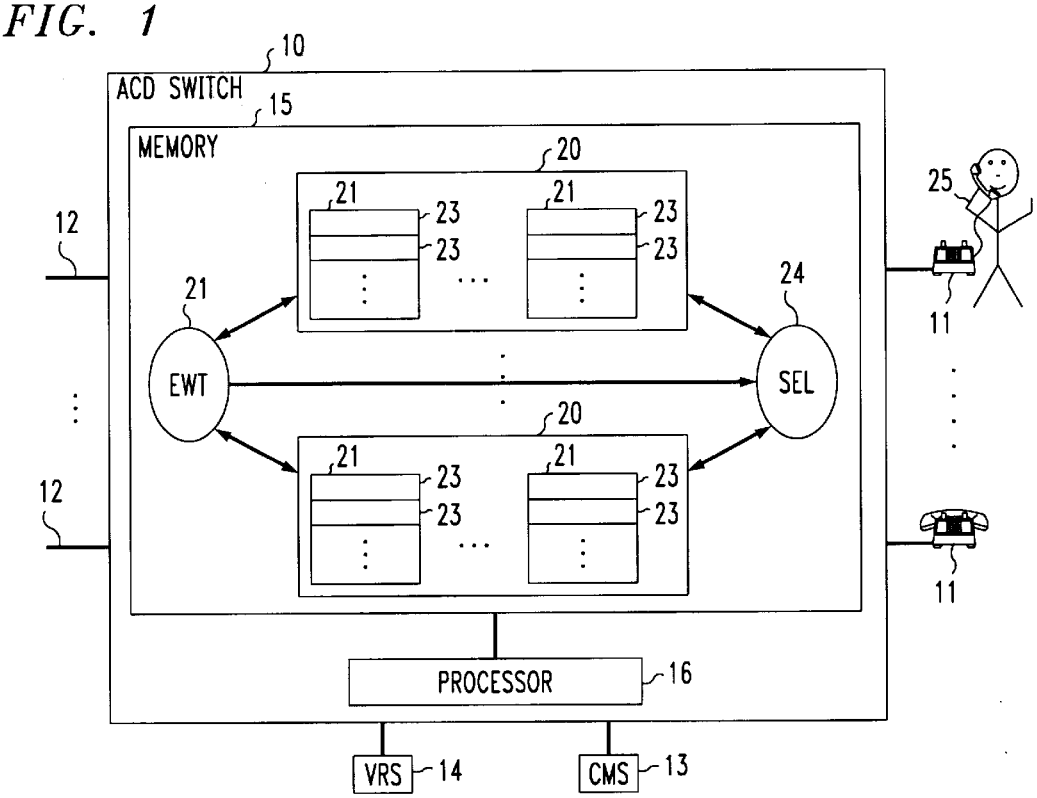
FIG. 1 is a block diagram of a call center that includes an illustrative embodiment of the invention.

FIG. 1 shows an illustrative call center that comprises an automatic call-distribution (ACD) switch 10 serving a plurality of agent stations 11 at least some of which are staffed by agents 25. ACD switch 10 is connected to a plurality of trunks 12 over which it receives incoming calls. It then distributes and connects these calls to stations 11 of available agents 25 based on a set of predetermined criteria. The agents process calls sent to them by ACD switch 10. The call center of FIG. 1 is illustratively the subscriber-premises equipment disclosed in U.S. Pat. No. 5,206,903, which is hereby incorporated herein by reference.

ACD switch 10 is also served by a pair of adjunct processors 13 and 14. Call management system (CMS) 13 provides a call accounting, reporting, and management capability, and a voice information system (VIS) 14 provides an announcements capability. Both adjunct processors 13 and 14 are conventional. CMS 13 is illustratively the Lucent Technologies CMS, and VIS 14 is illustratively the Lucent Technologies Conversant® VIS. As is conventional, ACD system 10 is a stored-program-controlled unit that includes a memory 15 comprising one or more different memory units for storing programs and data, and a processor 16 for executing the stored programs and using the stored data in their execution. The memory includes a plurality of sets 20 of call queues 21. Each set 20 of call queues 21 conventionally serves and holds calls for a different split or skill group of agents. Within each set 20 of call queues 21, each queue 21 holds calls of a different priority. Alternatively, each set 20 comprises only one call queue 21 in which calls of different priority are enqueued in their order of priority. Calls are assigned different priorities in a known manner based upon some predefined criteria such as, for example, whether the caller is an unknown person, a regular account holder, or a preferred customer. Calls may likewise be assigned different priorities based on the call's medium or media, e.g., video, voice-only, e-mail, etc. Each queue 21 functions as a first-in, first-out (FIFO) buffer memory, and includes a plurality of entries, or positions 23, each for identifying a corresponding one enqueued call. The position 23 at the head of queue 21 is considered to be position number 1, the next subsequent position 23 in queue 21 is considered to be position number 2, etc.

Memory 15 further includes an estimated wait time (EWT) function 22. As its name implies, this function determines an estimate of how long a call that is placed in queue 21 will have to wait before being connected to a station 11 for servicing. The estimate is derived separately by EWT function 22 for each queue 21 of each set 20. It is based on the average rate of advance of calls through positions 23 of the calls' corresponding queue 21. An illustrative implementation of EWT function 22 is disclosed in U.S. Pat. No. 5,506,898, which is hereby incorporated herein by reference.

Memory 15 further includes a call-selection (SEL) function 24. Function 24 is conventional in that, for each call at the head of a queue 21, it determines how long the call has been in the queue (the call's present wait time, or PWT), and in that, for each available agent 25 it selects a call from queues 21 for connection to and handling by that agent 25. According to the invention, however, SEL function 24 does riot select calls on an oldest-call waiting (OCW) basis. Rather, when an agent 25 becomes available, SEL function considers the call at the head of the highest-priority non-empty queue 21 of each set 20 from which that agent is eligible to handle a c(all, and selects the call that is farthest along according to some predefined measure—either in actual time or as a percentage of the service-time objective, or as a combination of the two, for example—in exceeding its service-time objective. If no call happens to have already exceeded its service time objective, the call that comes closest to exceeding its objective is selected. If any calls happen to have already exceeded their service-time objectives, the call that has most exceeded its objective is selected. This functionality of SEL function 24 is flow-charted in FIG. 2.

Figure 2:
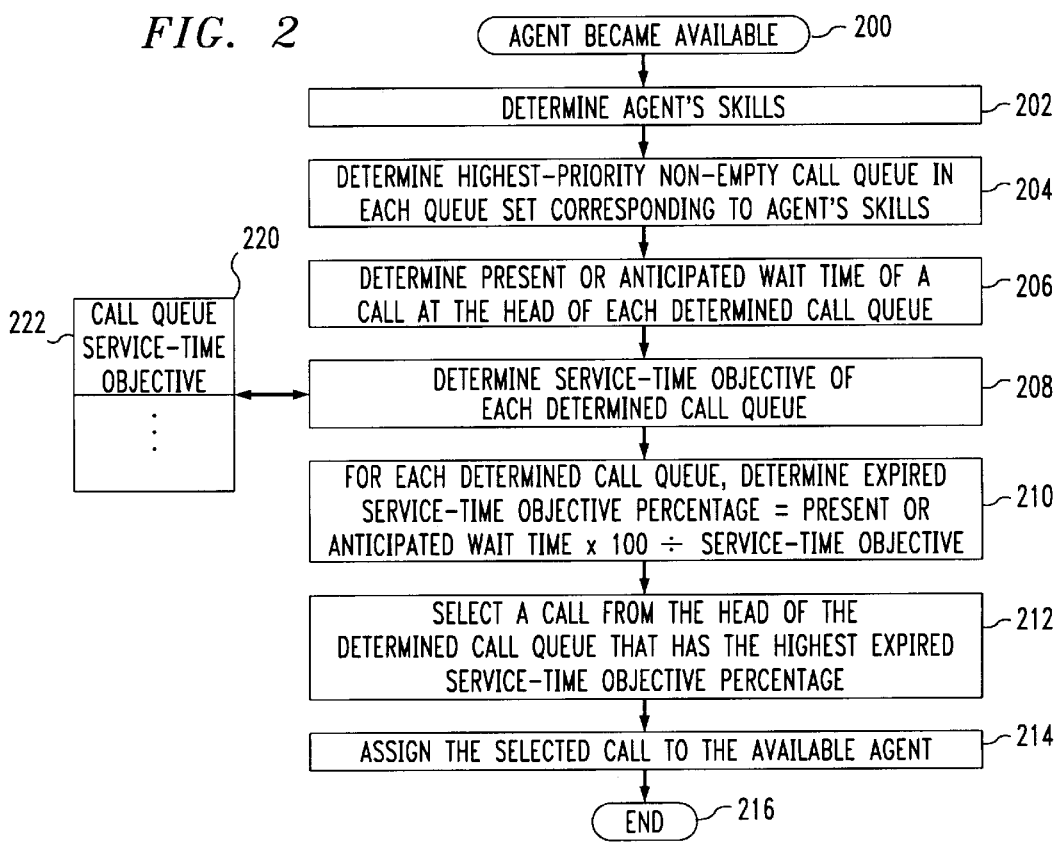
FIG. 2 is a flow diagram of operations of the SEL function of the call center of FIG. 1.

As shown in FIG. 2, SEL function 24 includes a table 220 of pre-administered (i.e., pre-programmed) values of service-time objectives 222, one assigned to each queue 21, i.e., to the calls in each queue 21. By placing a call in a particular queue 21, ACD system 10 assigns that queue's service-time objective 222 to that call. Each objective 222 represents a limit on the amount of time from entering the corresponding queue 21 that a call should spend waiting in queue 21 before being connected to and/or answered by an agent 25. Execution of SEL function 24 is invoked each time that an agent 25 becomes available to handle a call, at step 200. In response, SEL function 25 determines, from the agent's stored profile, the skills or splits to which agent 25 is assigned, at step 202. SEL function 24 then determines the highest-priority non-empty call queue 21 in each set 20 that corresponds to the agent's skills or splits, at step 204. That is, for each of the agent's skills or splits, SEL function 24 selects the corresponding set 20 of call queues 21, and determines the highest-priority call queue 21 in each selected set 20 which contains at least one call.

For the call at the head of each of the determined call queues 21, SEL function 24 determines how long that call has been in queue (i.e., determines the call's present wait time), in a conventional manner, at step 206. Alternatively, SEL function 24 may determine the call's anticipated wait time, as disclosed in the copending application of A. D. Flockhart, et al. entitled "Waiting Call Selection Based on Anticipated Wait Times", Ser. No. 08/813,513, now U.S. Pat. No. 5,905,793 filed on even date herewith and assigned to the same assignee, which is hereby incorporated herein by reference. Also, for each of the determined call queues 21, SEL function 24 determines the corresponding service-time objective 222 from table 220, at step 208. For each of the calls at the heads of the determined call queues 21, SEL function 24 then computes the expired service-time objective ratio or percentage, by dividing the 35 wait time obtained at step 206 by the service-time objective and for percentage multiplying the result by 100, at step 210. Preferably, prior to the next step, the computed ratios are normalized, to compensate for differences in orders of magnitude of the objectives of the different queues. For example, each ratio may be weighted by a dividend of the average rate of advance of calls through the corresponding queue and the time remaining to expiration of the queue's service-time objective. SEL function 24 then compares the computed/normalized expired service-time objective ratios or percentages and selects the call that has the highest expired service-time objective ratios or percentage, at step 212. If two or more calls have the same expired service-time objective percentage, SEL function 24 selects from among them the call which has the highest priority. Alternatively, SEL function 24 may compute at step 210 the difference between the service-time objective and the actual or anticipated wait time for each of the subject calls, by subtracting the wait time obtained at step 206 from the service time objective, and then selecting at step 212 the call that has the lowest (including negative) resulting difference. SEL function 24 then assigns the selected call to the agent 25 who became available at step 200, at step 214, and ends execution, at step 216, until an agent 25 becomes available again.

Of course, various changes and modifications to the illustrative embodiment described above will be apparent to those skilled in the art. For example, each queue position 23 may include a separate service-time objective value for the individual call that is presently in that queue position (computed, for example, in a like manner as the call priorities in the application of A. D. Flockhart et al. entitled "Prediction of a Caller's Motivation as a Basis for Selecting Treatment of an Incoming Call", Ser. No. 08/505,142, filed on Jul. 21, 1995 and assigned to the same assignee, which is hereby incorporated herein by reference), and SEL function 24 then performs the determinations of steps 206–210 for every call in each of the queues which correspond to the available agent's skills or splits. Or, the SEL function may be performed by an adjunct processor that is connected to and controls the ACD switch via computer telephony integration (CTI). Such changes and modifications can be made without departing from the spirit and the scope of the invention and without diminishing its attendant advantages. It is therefore intended that such changes and modifications be covered by the following claims.

The invention claimed is:

1. A method of selecting one of a plurality of items that are waiting to be selected, comprising the steps of:
    assigning different ones of the plurality of items to different ones of a plurality of waiting-time limits;
    determining which one of the plurality of items is farthest along in exceeding its assigned waiting-time limit; and
    selecting the determined one of the plurality of items.

2. The method of claim 1 further comprising the step of:
    repeating the second and third steps of claim 1 until only one item of the plurality of items remains waiting to be selected.

3. The method of claim 1 wherein:

the step of determining comprises the steps of determining a present waiting time for each one of the plurality of items, and determining a ratio of the present waiting time and the assigned waiting-time limit for each one of the plurality of items; and the step of selecting comprises the step of selecting the item having a largest determined said ratio.

4. The method of claim 1 wherein:

the step of determining comprises the steps of determining a present waiting time for each one of the plurality of items, and determining a percentage of the waiting-time limit represented by the present waiting time for each one of the plurality of items; and the step of selecting comprises the step of selecting the item having a largest determined said percentage.

5. The method of claim 1 wherein:

the step of determining comprises the steps of anticipating how long each one of the plurality of items will have waited to be selected if said item is not selected first from among the plurality of items, and determining which one of the plurality of items has an anticipated wait time that is farthest along in exceeding its assigned waiting-time limit.

6. The method of claim 1 for selecting one of a plurality of items from a plurality of queues each having at least one enqueued item, wherein:

the step of assigning comprises the step of assigning different ones of the plurality of waiting-time limits to different ones of the plurality of queues; and the step of determining comprises the steps of determining which one of items that are enqueued at heads of the queues is farthest along in exceeding the waiting-time limit of its queue.

7. The method of claim 6 further comprising the step of:

repeating the steps of determining which one of the items that are enqueued at heads of the queues is farthest along in exceeding the waiting-time limit of its queue and selecting the determined one of the plurality of items until only one of the plurality of the queues has any items enqueued therein.

8. The method of claim 1 wherein:

the plurality of items are waiting to be selected for processing, and the selected item is selected for being processed first from among the waiting items.

9. A method of selecting for processing one of a plurality of communications that are waiting to be processed, comprising the steps of:

assigning different ones of the plurality of waiting communications to different ones of a plurality of waiting-time limits;

determining which one of the plurality of waiting communications is farthest along in exceeding its assigned waiting-time limit; and first processing the determined one of the plurality of waiting communications.

10. The method of claim 9 further comprising the step of:

repeating the second and third steps of claim 9 until only one communication of the plurality of communications remains waiting to be processed.

11. The method of claim 9 wherein:

the step of determining comprises the steps of determining a present waiting time indicative of how long a communication has been waiting to be processed, for each one of the plurality of communications, and determining a ratio of the present waiting time and the assigned waiting-time limit for each one of the plurality of communications; and the step of first processing comprises first processing the communication having a largest determined said ratio.

12. The method of claim 11 wherein:

the step of determining a ratio comprises the step of determining a percentage of the waiting-time limit represented by the present waiting time, for each one of the plurality of communications.

13. The method of claim 9 for selecting for processing one of a plurality of communications from a plurality of queues each having at least one enqueued communication, wherein:

the step of assigning comprises the step of assigning different ones of the plurality of waiting-time limits to different ones of the queues; and the step of determining comprises the step of determining which one of communications waiting at heads of the queues is farthest along in exceeding the waiting-time limit of its queue.

14. The method of claim 13 wherein:

the step of determining which one of the communications waiting at heads of the queues is farthest along in exceeding the waiting-time limit of its queue comprises the steps of determining a present waiting time indicative of how long a communication has been waiting to be processed, for each of the communications waiting at heads of the queues, and determining a ratio of the present waiting time and the waiting-time limit assigned to the queue for each one of the communications waiting at heads of the queues; and the step of first processing comprises the step of first processing the one of the communications waiting at heads of the queues which has a highest determined said ratio.

15. The method of claim 14 further comprising the step of:

repeating the steps of claim 13 other than the step of assigning until only one of the plurality of the queues has any communications enqueued therein.

16. The method of claim 9 for selecting for processing one of a plurality of communications from a plurality of queues each having at least one enqueued communication, wherein:

each one of the queues corresponds to a different skill or split;

the step of assigning comprises the step of assigning different ones of the plurality of waiting-time limits to different ones of the queues;

the step of determining comprises the steps of in response to an agent becoming available to process a communication, determining skills or splits that correspond to the agent, and in response to determining the skills or splits that correspond to the agent, determining which one of communications enqueued at heads of the queues that correspond to the skills or splits that correspond to the agent is farthest along in exceeding its assigned waiting-time limit.

17. An apparatus comprising a processor that executes instructions to effect the steps of claim 1 or 2 or 3 or 4 or 5 or 6 or 7 or 8 or 9 or 10 or 11 or 12 or 13 or 14 or 15 or 16.

18. A computer-readable medium containing software which, when executed in a computer, causes the computer to perform the steps of claim 1 or 2 or 3 or 4 or 5 or 6 or 7 or 8 or 9 or 10 or 11 or 12 or 13 or 14 or 15 or 16.

19. An apparatus for selecting one of a plurality of items that are waiting to be selected, comprising:

- a memory for storing different ones of a plurality of waiting-time limits assigned to different ones of the plurality of items;
- an effector, cooperative with the memory, of determining which one of the plurality of items is farthest along in exceeding its assigned waiting-time limit; and
- a selector, cooperative with the effector, for selecting the determined one of the plurality of items.

20. An apparatus for selecting one of a plurality of items that are waiting to be selected, comprising:

- means for storing different ones of a plurality of waiting-time limits assigned to different ones of the plurality of items;
- means cooperative with the storing means, for determining which one of the plurality of items is farthest along in exceeding its assigned waiting time limit; and
- means cooperative with the determining means, for selecting the determined one of the plurality of items.

* * * * *